March 19, 1963

K. H. STEIGERWALD 3,081,485

PROCESS AND APPARATUS FOR TREATING
SYNTHETIC PLASTIC MATERIALS

Filed Nov. 20, 1958

INVENTOR.
KARL HEINZ STEIGERWALD

BY
*Emery Whittmore Sandoe & Graham*

ATTORNEYS

March 19, 1963 K. H. STEIGERWALD 3,081,485
PROCESS AND APPARATUS FOR TREATING
SYNTHETIC PLASTIC MATERIALS
Filed Nov. 20, 1958 5 Sheets-Sheet 2

INVENTOR.
KARL HEINZ STEIGERWALD
BY
ATTORNEYS

March 19, 1963
K. H. STEIGERWALD
3,081,485
PROCESS AND APPARATUS FOR TREATING
SYNTHETIC PLASTIC MATERIALS
Filed Nov. 20, 1958
5 Sheets—Sheet 3
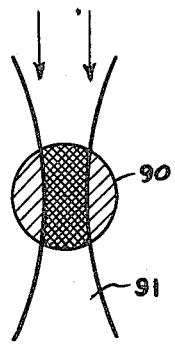
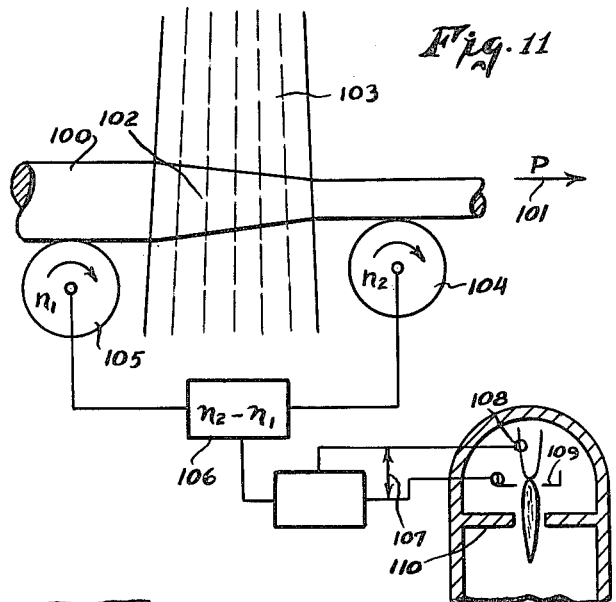
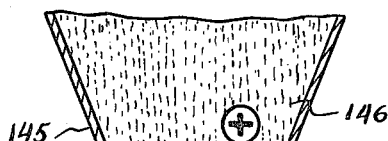
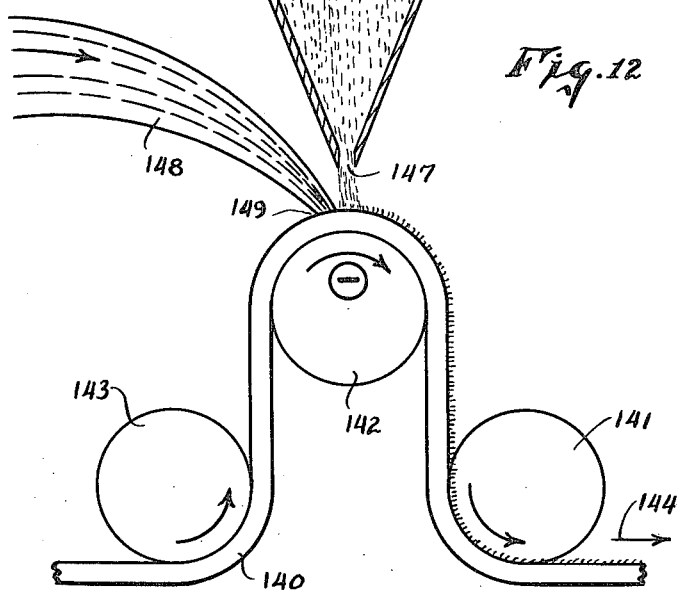
INVENTOR.
KARL HEINZ STEIGERWALD
BY
ATTORNEYS

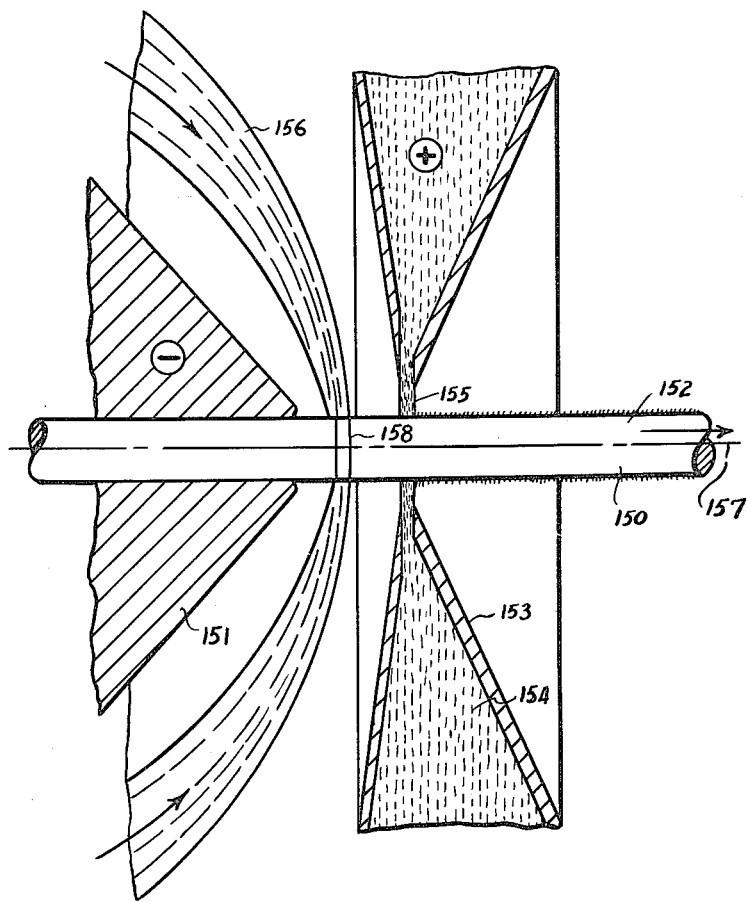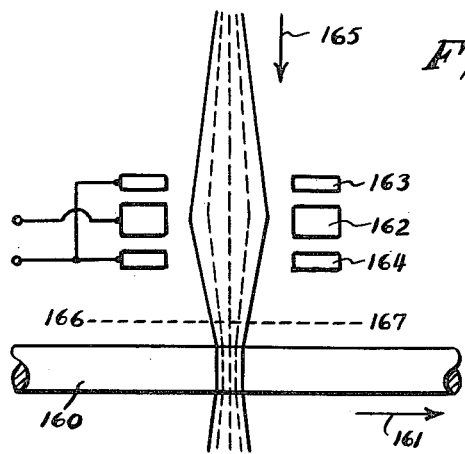

March 19, 1963  K. H. STEIGERWALD  3,081,485
PROCESS AND APPARATUS FOR TREATING
SYNTHETIC PLASTIC MATERIALS
Filed Nov. 20, 1958  5 Sheets—Sheet 5
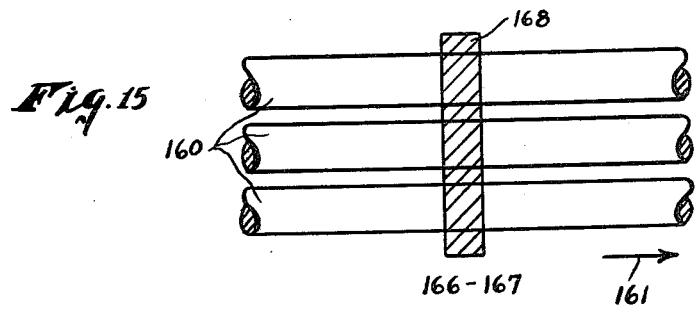
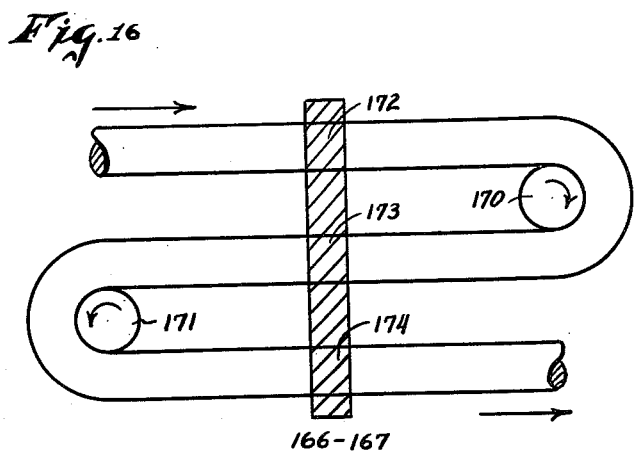
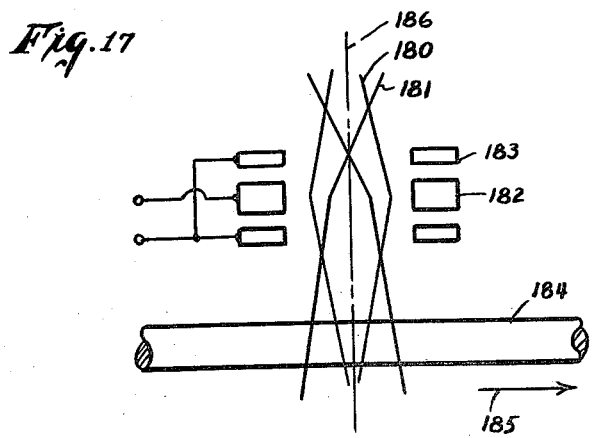
INVENTOR.
KARL HEINZ STEIGERWALD
BY
ATTORNEYS

United States Patent Office 3,081,485
Patented Mar. 19, 1963

3,081,485
PROCESS AND APPARATUS FOR TREATING SYNTHETIC PLASTIC MATERIALS
Karl Heinz Steigerwald, Sauerbruch-Strasse 10, Heidenheim, Germany
Filed Nov. 20, 1958, Ser. No. 777,808
11 Claims. (Cl. 18—1)

The invention relates to a process and apparatus for the treatment of formed articles of thermoplastic artificial or synthetic materials. These materials have the property of softening when heated to a specific temperature which differs with each artificial material. Mechanical treatments, such as strengthening, can be carried out when the materials are heated above said softening point. This property is, however, limited to materials whose decomposition point is above their softening point, and the present invention is, therefore, limited to such materials.

My new process and apparatus permits treatment of artificial materials made of polyethylene, such as have, for example, become known under the trade names "Aviscope," "Firestone," "Reevon," or "Wynene." The process and apparatus also permits treatment of materials made of polystyrene, for example, "Polyfiber," or materials made of polyvinyl chloride, for example, "Saran" or "Permalon." Other materials which can be treated by the use of my new process and apparatus are those made of polyamides, for example, "nylon" or "Perlon," or those made of polyurethans.

When processing artificial materials, such as polyamides, thermal and mechanical treatments of the material are used in many different ways. It is known to use for the heating of materials to be treated, heat baths in heated liquids, vapors or gases, heat contact with heated bodies, such as, for instance, rolls, as well as irradiation with heat rays, ultrasound or high-frequency electromagnetic radiation. These known heating methods can be divided into two groups. The first group communicates the heat to the body to be heated by way of external heat conduction. The second group uses irradiation or penetration of the material with rays in conjunction with absorption of energy within the body itself.

Whereas the first group has produced limited results owing to the low thermal conductivity of the material [about 0.25 kcal./m.-h. ° C., kilocalories per (meter) (hour) (° centigrade)] and the relatively low permissible gradient of temperature, the second group has offered difficulties with respect to obtaining high irradiation intensity and sufficient absorption of energy from the radiation.

Particularly disturbing disadvantages of the known heating methods result from their adjusting properties. With these methods maintenance or adjustment is attained only imperfectly. Much more disturbing, however, is the slowness of the adjustment which is caused either by the high thermal capacity of the energy-transmitting means or by the large effective range of the transmission of energy made necessary by the low density of energy. Insufficient transmission of energy and slow adjusting properties produce uneconomical operating conditions for production plants based on the known processes.

It is, therefore, an object of the present invention to describe a process and apparatus which permits of an accurately dosable, easily adjustable and practically inertialess heating of the artificial materials to be treated. According to the invention this heating is carried out in that the artificial materials to be treated are impacted with charged particles especially electrons.

It is known that polymerization or cross-linking effects occur in artificial materials which are irradiated, for several seconds to minutes, with very fast electrons of rather low current density. It has been found that said polymerization effects depend, at the same current density, substantially on the total dose used per gram of irradiated material as measured in roentgen. The effect produced with the same total dose increases is the direction of smaller current densities. With increasing current densities the polymerization effect decreases until it becomes practically nil.

It is another object of the invention to avoid polymerization effects during the irradiation of thermoplastic artificial materials and merely to produce a heating. This object is attained in that a beam of charged particles is so focussed on the material to be treated that a very high power density of, for example, 2 kw./sq. mm. (kilowatts per square millimeter) is produced, and that, moreover, the irradiation interval is very short. At the power density indicated above, an irradiation time of about $10^{-4}$ to $10^{-5}$ second is sufficient to heat the artificial materials.

When artificial materials are irradiated with a beam of charged particles, there generally occurs an electric charging of the materials thus irradiated. However, experiments have shown that said charging is not a disturbing factor in the new process. This is due to the fact that small traces of the irradiated material are evaporated during the irradiation. The quantity of these evaporating materials is negligible and does not make itself felt in the actual processing, but it does suffice to remove the electric charges produced by the beam of charged particles.

It is another object of my invention to control the absorption of energy in the material to be treated in such a way that only predeterminable ranges of the cross-section of the material are heated. This can, for example, be done in that only a portion of the cross-section of the material is irradiated by means of said beam of charged particles.

It is practically impossible to carry out such heating with the previously known heating methods, especially in the case where small heating ranges are sought and sharp boundary surfaces between the heated and the unheated regions are necessary for the objects to be achieved.

The new process and apparatus thus makes it possible either to supply uniform heat to the entire irradiated volume in the shortest possible time, or to supply heat, preferentially, to particular regions, for instance, to the center or to a narrow peripheral area. This and the subsequent course of the cooling process produce a heating effect, the distribution of which over the total volume can be controlled to a high degree.

My process will, for example, make it possible, when stretching fibers or bands of thermoplastic material, rapidly to heat previously hardened materials despite their poor thermal conductivity, since the charge carriers, when irradiating the material, yield their energy in the entire volume of the irradiated material if a suitable velocity is selected.

Consequently, it is still another object of the invention to permit a stretching of fibers made of thermoplastic artificial material beyond the degree of stretching customary.

Particularly favorable conditions with respect to the technical execution of the process and the intensities to be attained result from the use of electrons. As shown by experiments, for irradiating materials having layers of 1 millimeter and less, an accelerating potential of less than 400 kilovolts is necessary. If filaments with a maximum diameter of 0.5 millimeter are used, accelerating potentials of up to 250 kilovolts are required. With proper irradiation arrangements, which will be described later, an accelerating potential of only 150 kilovolts will be sufficient. All of these values are within a range which can readily be controlled with standard electro-technical equipment.

It is still another object of my invention to vary the radiation intensity periodically; this can, for example, be done by an intermittent control of the beam producing system.

According to a further object of my invention, the material to be processed, especially in the form of bands, filaments, woven or plaited textures, is exposed repeatedly to the same beam of charged particles in equal or unequal manner with respect to time and/or place. It is also possible to use several beams of identical or different composition.

It is another object of my invention to regulate the intensity of the beam, automatically and practically inertialess, in dependence on an effect produced by the radiation.

It is still a further object of the invention to produce coatings of thermoplastic artificial material. For this purpose the artificial materials are heated to the softening point by means of a beam of charged particles and are then charged with coating materials. The coating materials used may be, for example, animal fibers, graphite, silicones, metals, metallic vapors, dyes, radioactive substances or other artificial materials.

Such coating requires that the material to be treated be intensively irradiated superficially once or several times in succession, whereby the surface of the fibers is briefly softened or melted in very thin layers. The additional substance is applied to said softened layer, for example by using electric fields, similar to those used in electromagnetic spraying processes. During the heating, the inner volume of the fiber is not affected or only to a very small degree; the mechanical properties of the fiber, therefore, remain practically unchanged. None of the heating processes known in the past permits melting a very thin surface layer in an extremely short time and practically without affecting the inner layers.

The above-described process and apparatus for combining irradiated material with other substances may serve for such special purposes as dyeing, impregnating, for instance, against absorption of moisture, producing electrically conductive or light-reflecting fabrics, etc.

The process not only permits treatment of one or several separate fibers or filaments, but also treatment of textured materials, plaited fabrics, fiber mixtures, bands, plates, round material, etc., with beams of suitable geometrical shape.

The invention, accordingly, is involved in those steps in the process wherein the controlled inertialess heating is accomplished in conjunction with physical treatment of the product which is heated, as well as the features of construction and the combination, of elements embodied in the apparatus for achieving the desired results.

This application is filed as a continuation-in-part of my copending application, Serial No. 502,938, filed April 21, 1955, now abandoned.

The invention will now be explained by way of the embodiments shown in the accompanying drawing, in which:

FIGURE 10 is an example of the penetration of a fiber by beams within only one sector;

FIGURE 11 is an arrangement for the automatic control of a stretching process;

FIGURES 12 and 13 show arrangements for combining an artificial fiber with additional materials;

FIGURES 14–16 show examples for the distribution of several places of irradiation with respect to one electron beam;

FIGURE 17 is an example of the irradiation of a fiber with electron beams of different composition.

Figure 1:
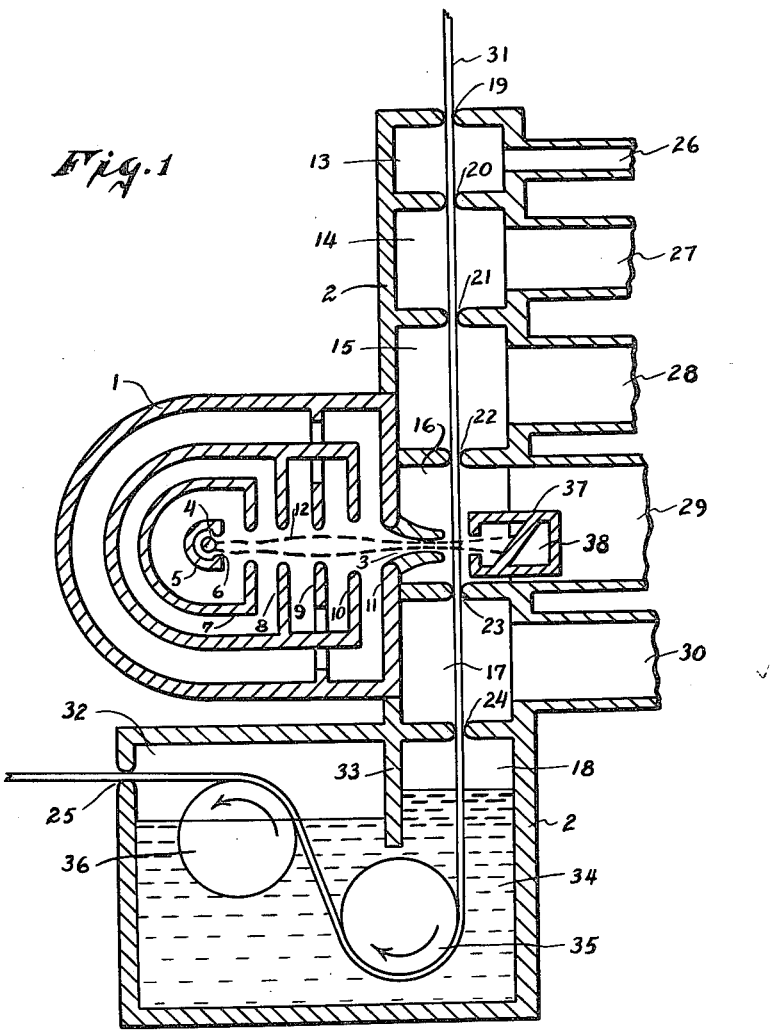
FIGURE 1 shows the basic construction of a plant for treating fibers or filaments with electron beams as a longitudinal section through the cylindrical apparatus.

A metal vacuum container 1 is mechanically connected to a second container 2. The cross-sectional parts of the containers 1 and 2 are perpendicular to the plane of drawing and are extended cylindrically. Both are at earth potential.

The inside of the chambers 1 and 2 are connected by the slot 3. In the center of 1 there is an incandescent cathode consisting of a tungsten wire 4 extending perpendicularly to the plane of the drawing. It is surrounded by the electrode 5 with a slot 6 in the direction of the slot 3 for the emission of the electrons. Between 3 and 6 the electrodes 7–11 form a further series of slots. The electrodes 4, 5, 7–11 are in the order shown encapsulated, but are insulated from each other by insulation which is not shown. Electrodes 8 and 10, as well as 9, and 11, form an exception, as they have the same potential. For the operation of the installation, a source of direct current is necessary which supplies 3 grounded negative voltages of 100, 200 and 300 kilovolts. In addition, a supplementary potential is necessary, negative relative to the −300 kilovolts potential and adjustable to a maximum of −1 kilovolt, as well as the supplementary means for the heating of cathode 4. The potential distribution is in the manner known as follows: Incandescent wire 4: −300 kilovolts; Wehnelt cylinder 5: −300 kilovolts (−1 kilovolt adjustable); electrode 7: −200 kilovolts; electrode 8: −100 kilovolts; electrode 9: earth potential. The installation produces a band-shaped electron beam extending perpendicularly to the plane of the drawing, the electrons of which move, in section 12, from 4 towards 3. The multiple step accelerating system shown is only a schematic example. The scale of the various parts is not uniform, and the form of the electrodes is not a special case. For the production of the electron beam, the well-known principles for the production of electron beams and electron optics can be used for the invention.

At the electrode 9 the electrons reach a speed of 300,000 e.v. Together with 9, electrode 10, which has a potential of −100 kilovolts, and electrode 11, which has earth potential, form an electrostatic cylinder lens, whose refractive power is effective in the plane of the drawing and perpendicularly to the direction of the electron beam. The beam, consequently, is focused astigmatically behind 3 and passes through 3 into chamber 2.

The intensity of the electron beam can be controlled by adjusting the voltage on the Wehnelt cylinder 5. For example, if this voltage becomes negative, the intensity of the beam is reduced, and vice versa.

The container 2, by means of walls, is divided into several compartments, 13—18, which are connected by the slots 20—24. The compartments 13—17 are connected with vacuum pumps by means of the pump leads 26—30, which are held under various chosen intensities of vacuum in well-known manner. In this manner, the compartments 13—16 form a series of pressure steps which are connected by slots 19—22 in such manner that through these slots one or more filaments and/or bands, with flat cross section, can be conveyed from the outside into compartment 16. The filaments and/or bands close the slots to such an extent that it is possible, with the aid of the pumps 26—29 connected by the pump leads, to create the following pressure steps: Outer pressure—atmospheric pressure; compartment 13: 10 torr; 14: 1 torr; 15: 0.1–0.5 torr; 16: 0.001 torr. Container 1 is likewise evacuated by a pump lead, not shown for clarity, so that a pressure of $10^{-4}$ torr exists therein.

The material which is to be irradiated can be carried by well-known transporting means, such as, for instance, rollers, through slit 19 and the following chambers, to the exit point 3 of the electron beam. Chambers 13 to 18 can also be equipped with well-known vacuum technical transporting devices, in order to transport the filaments or the bands, respectively. The material to be irradiated travels past 3 and through 23, 17, 24, to 18. Compartment 18 is partially filled with a suitable liquid, for example, mercury so that by means of this and the wall 33, a gas tight seal against the atmospheric pressure is created. In 32 the pressure of 10 torr will be maintained by means of a pump lead, which is not shown, so that mercury levels in 32 and 18 do not have too great a differential. In this manner the external pressure is separated from the internal pressure, without too great a utilization of pumps. With equipment similar in principle to that shown in FIGURE 1, it is possible to introduce and remove the material into and from the vacuum in sequence, and/or simultaneously. In FIG. 1 the material irradiated passes over rolls 35 and 36, through the slit 25, to the outside room.

Independently of its action as a vacuum seal the mercury bath 18 also acts as a cooling medium for the heated material. As in similar cases, the desired cooling effect on the material is determined by the distance which the material travels through the mercury. In place of the installation shown, it is naturally possible to use other cooling methods in corresponding design, either in or outside of the vacuum chamber.

Just as it is possible to transport the material to be irradiated into an evacuated chamber with the aid of suitable means known per se, it also comes within the scope of the invention to transport the electron beam from the vacuum chamber into a chamber of higher pressure, for instance, atmospheric pressure or even higher pressure, by using appropriate means known per se. This makes it possible to carry out the treatment under the desired atmospheric pressure and chemical reaction conditions.

The following data will serve as an example of the capacity of such an irradiation installation; a stretched filament made of polyamide, for example a filament known under the trade name "nylon," with a diameter of 0.5 millimeter is to be heated from 20° C. to 210° C. If the filament is heated over a length of 1 millimeter by means of an electron beam with a current density of 10 milliamperes per square millimeter and having a speed of 300,000 e.v. then the desired effect can be achieved when the filment passes the slot 3 with a speed of 20 meters per second. After the filament has been heated it can be subjected to stretching beyond the slot 3. In the present example the filament is thus irradiated with a beam of very high effective density for an extremely short time ($5 \cdot 10^{-5}$ second). No polymerization effects were observed, nor were there any disturbing electric chargings of the filament.

The above-indicated velocity of passage of the filament corresponds to a through put of 16 kilograms per hour. Since it is readily possible, by extending the length of the installation perpendicularly to the plane of the drawing of FIGURE 1, to provide an installation so that, for example, 100 filaments can be treated simultaneously by one electron beam, the capacity of the process will be readily apparent.

The arrangement shown in FIGURE 1 provides the trap 37, which serves the purpose of catching the surplus electrons. It is, by means of the tubular device 38, subjected to a cooling medium which conveys away the heat energy it absorbed. The trap in the case shown has the earth potential. In place of wasting the surplus energy the equipment can be so arranged that several installations, according to container 2, can be placed in series. If necessary differently sized slots for materials of different dimensions can be provided. Between the individual installations electron optical arrangements can be installed for further focusing of the electron beam. In addition to electrostatic lenses, magnetic lenses can also be used in all or several parts of the installation. Basically, it can be mentioned that the combination possibilities of one or more electron beam or charged corpuscles beam producers, or other radiation installations are manifold and the design shown using one electron beam should not be considered a limitation in the subject matter of the invention in this regard. Thus, it is possible also to use differently shaped beams. In the same manner a layout can be made so that one and the same filament or formed object can be exposed several times in sequence to the same electron beam.

Figure 2:
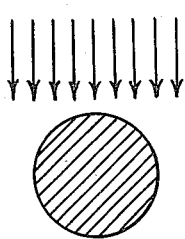
FIGURES 2–5 show various ways of irradiating the fibers.

In FIGURE 2 the relations of FIGURE 1 are repeated. As the energy given off by the electron beam in the various parts of the volume of the filament is dependent upon the average energy of the electrons within each volume element (see also table 1), the form of the beam which is shown in FIGURE 2, can achieve a reasonably uniform heating of the volume of the filament only if the electron speed is sufficient to achieve a far-reaching penetration of the filament. If, however, the electron beam is composed of electrons of different speeds in a proper manner, for example of electrons with a speed of 100, 200 and 300 e.kv., then it is possible to apply heat preferentially to specific zones, for example, the center of the filament or the perimeter of the filament. A continuous spectrum of electrons of all speeds is still more appropriate for this purpose. In order to obtain the desired effect it is generally unimportant whether the electrons of different speeds irradiate the object simultaneously or in sequence so long as the time interval between the different speeds of electrons applied to the material is short enough. It is, therefore, possible, for example, through application of high frequency pulsating direct voltages to the electrodes of the radiation system to create a sequence of electrons with various speeds, whose energy application to the various areas of the filament cross section is determined by the variation of the electrode potentials.

Figure 3:
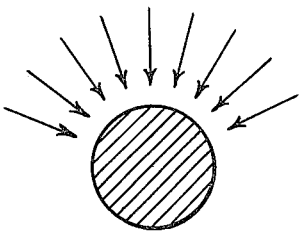

In the case shown in FIGURE 3, the radiation, through astigmatic focusing, in the plane of the cross section is concentrated in the center of the filament, in accordance with which, for example, a preferential heating of the center of the filament is obtained. For the remainder, similar conditions exist as in the case of FIGURE 2.

Figure 4:
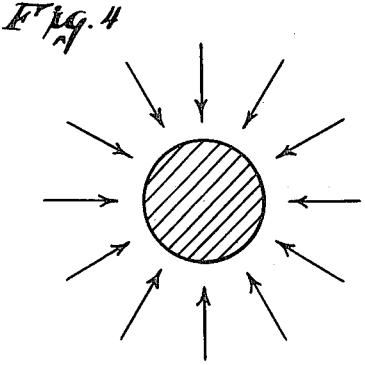
Figure 5:
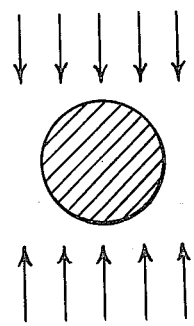

FIGURES 4 and 5 show cases with concentric and two-sided irradiation respectively. In addition to the possibility of obtaining the results through the use of electrons penetrating only half as deeply, there is also the possibility of a favorable regulation of the energy distribution.

Figure 6:
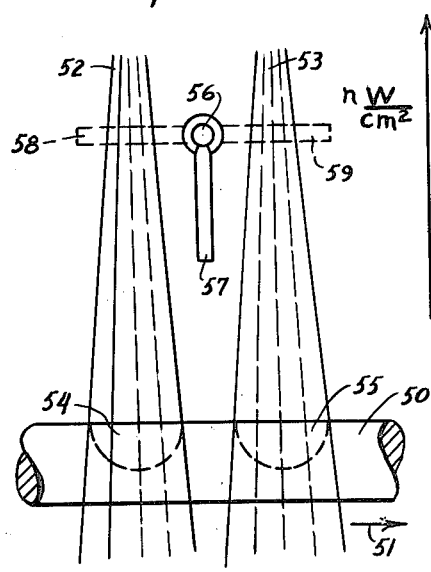
FIGURE 6 shows an arrangement for the repeated irradiation of a fiber.

FIGURE 6 schematically shows an example of multiple irradiation of several portions of a filament, consecutive in the direction of its transport. In this manner, radiation energy can be applied uniformly or non-uniformly with respect to place or time or both place and time. The filament 50 is moving in the plane of drawing and in the direction indicated by the arrow 51. 52 and 53 represent two electron beams or groups of beams, which for instance may be emitted from one and the same source. They impinge on the filament portions marked 54 and 55, following one another in the direction of transport 51. 56 represents the driving shaft of the flap 57 which is capable of being rotated about the driving shaft arranged perpendicularly to the plane of drawing. In the position 57, drawn in full, the flap does not interfere with either of the two electron beams; if, however, the flap is turned into either of the positions 58 and 59, indicated in broken lines, it will stop the corresponding beam and thereby keep one of the portions 54 and 55 from being irradiated. The flap as well as the driving shaft may consequently be heated by the energy of the beam and are to be designed in such a way as not to reach a temperature endangering the tightness of the necessary vacuum seal or other parts of the arrangement. This may be effected by cooling means in the well-known manner. The diagram shows one example only out of a variety of possible arrangements.

Figure 7:
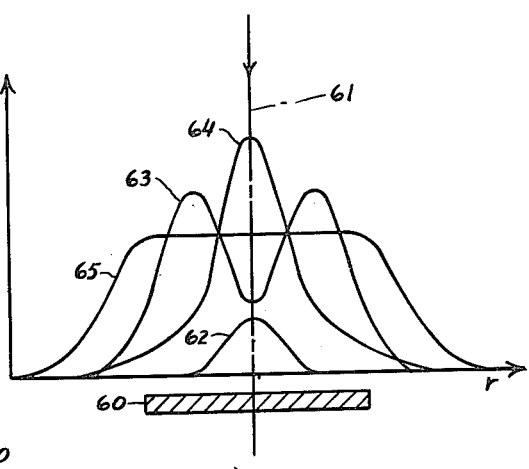
FIGURE 7 is a diagram showing different kinds of distribution of the absorption of energy in the irradiated material.

The diagram of FIGURE 7 shows an example of possible distributions of energy in the electron beam. On the abscissa, the radius $r$ of a filament of circular cylindrical shape is represented. A section through a circular disc-shaped element of the filament is shown as 60; its axis 61 lies in the plane of drawing. The radiation impinges onto it in a direction perpendicular to the plane of drawing. The power density $n$ (in watts per square centimeters) of the incident radiation is marked off along the ordinate. By simple arrangements of diaphragms or by means of well-known electron-optical systems, a great variety of intensity distributions in the electron beam can be achieved. The curves 62, 63, 64 and 65 show several examples of such distributions. In 62 the uninfluenced intensity distribution of an electron source working under conditions of space-charge is represented. It enables the preferential irradiation of central portions of the filament. After insertion of the diaphragm into the beam path, curve 64 can be produced by focusing the distribution of intensity. The intensity distribution 65 is realized by strongly defocusing the lens and by shading off the beam by means of a limiting diaphragm. The examples shown are not restricted to rotationally symmetrical beam shapes, but can be adapted for band-shaped and other beams.

Figure 8:
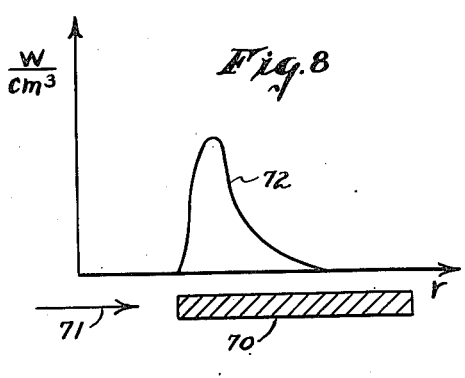
FIGURE 8 is a diagram showing the absorption of energy being limited to only one part of the volume of the material.
Figure 9:
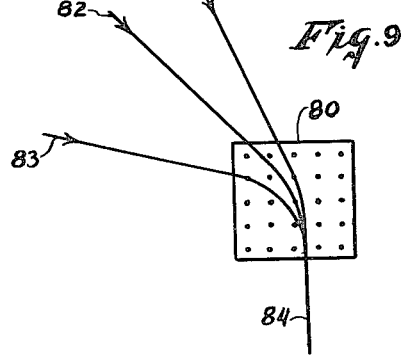
FIGURE 9 is an electron beam composed of beams of different velocity.

FIGURE 8 is a schematic example of the energy absorption being limited to only a portion of the volume although the radiation is being applied to the entire object to be treated. The dimension $r$ of an irradiated filament is plotted on the abscissa. The position of the filament cross-section 70 corresponds to the section 60 shown in FIGURE 7. The radiation is applied in the direction of arrow 71. By a proper choice of the accelerating potential it is possible to concentrate the energy absorption to one portion of the filament volume on account of the penetrating depth of the electrons being less than the filament thickness. An example of the absorption distribution thus effected is shown by the curve 72. On the ordinate, the power volume density (in watts per cubic centimeter), effected by the energy absorption in the irradiated material is marked off. As is easily seen, any desired energy absorption distribution curves can be realized by an appropriate choice of different electron speeds, and, for instance, the application of beams combined of several beams of differing speeds. An example of an electron beam combined of beams of different speeds is shown in the diagram of FIGURE 9. A magnetic field existing between two pole pieces and extending perpendicularly to the plane of drawing is represented by 80. Electron beams indicated by 81, 82 and 83 are injected into the magnetic field, and the deflection suffered by them depends on their different speeds, the radius of curvature of the beam path decreasing with decreasing speed. It is thus possible to inject the 3 beams 81, 82 and 83 into the magnetic field 80 in such a way as to deflect them all into one and the same path indicated by 84. Aberrations due to the astigmatic properties of the deflecting system have not been taken into consideration as these and similar aberrations are capable of being eliminated by well-known electron-optical compensating systems.

It is a further subject matter of the invention that, for instance, a cylindrical or tubular object made of artificial material is irradiated in such a way as to limit the penetrating beam to one sector or to a selected portion of its volume. An example of this is shown in FIGURE 10.

90 represents the cross-section of a circular-cylindrical polyamide filament. 91 is the cross-section of a band-shaped electron beam focused by means of cylindrical lenses extending along a path in the direction of the cylinder axis of 90 which is perpendicular to the plane of drawing. In this manner, only a portion of the volume is exposed to irradiation. By rotating the object 90 about its cylinder axis, it is for example possible to expose different regions of its volume to irradiation consecutively and to remove them again from the irradiating beam.

When applying the process according to the invention to the stretching process of artificial fibers, the irradiation of the fibers and their stretching are carried out simultaneously. This makes it possible to work out particularly simple and economical processes of manufacture. In principle, the invention permits putting together a continuously working plant, which stretches the material to a practically unlimited small diameter by means of simultaneous irradiation and stretching or of several consecutive irradiation and stretching processes. The process according to the invention, therefore, has the additional advantage of offering the possibility of producing a multiplicity of required final diameters of filaments with a single production plant while starting from the same spun or injected product.

It may be advantageous not to stretch the fiber rectilinearly after or during the irradiation, but to wind it by mechanical guiding, for example, into the shape of a spiral spring or twist it by rotating it about its own longitudinal axis.

It is understood that the processes described above do not only relate to the production of fibers or filaments, but, in principle, to the processing of any article made of artificial material, i.e., synthetic plastic. It is further to be expected that this new process will make it possible to treat materials which are not known at the present time. That is, it is to be assumed that new synthetic plastics will have the general property of low thermal conductivity and thermoplasticity to a degree sufficient to permit operation in accordance with these principles. The basic test is that the plastic softens before it decomposes with heating.

FIGURE 11 shows an example of an apparatus wherein the irradiation intensity is automatically controlled in dependence on an effect caused by the irradiation. 100 represents a filament of artificial material made of polyester, for example, a filament known under the trade name "Dacron," moving in the direction of the arrow 101 at a speed of 20 meters/second. At the place 102, it is hit by a focused electron beam having a current density of 10 milliampere at an accelerating potential of 250 kilovolts. During this process the filament is heated to about 240° C., said heating being uniform over the entire cross-section of the filament which is about 0.2 square millimeter. The transport of the filament is effected by driving elements schematically represented by 104 and 105, of which 104 exerts an adjustable tractive force P on the filament. This tractive force is to be effective between the pre-irradiation filament portion at the driving element 105 and the post-irradiation portion at the driving element 104. This force P will stretch the filament which has been made stretchable by the heating, thereby causing a difference in speeds $n_2-n_1$ between the driving elements 105 and 104. This difference in speeds can be measured by a measuring instrument 106 in a manner known per se. The value of the difference determines a control value for the voltage of the Wehnelt cylinder of the beam-producing system and, hence, for the intensity of the electron beam 103. The beam-producing system is composed of the incandescent filament 108, the Wehnelt electrode 109 and the earthed anode chamber 110. The measuring instrument 106 actuates an electromechanical automatic device, which automatically so adjusts the bias voltage 107 of the Wehnelt electrode 109 that the stretching is stabilized, i.e., that it remains constant within determinable limits independently of possible changes of the fibrous material. This method will, for example, permit production of an accurate final diameter of the stretched filament or fiber.

It may be advisable in some cases to measure the thickness of the material after stretching and of regulating the irradiation intensity accordingly. It may sometimes also be advantageous to keep the material in contact with a surrounding medium of certain properties, before or after irradiation.

FIGURE 12 shows an arrangement for combining an artificial fiber made of polyamide with additional materials. 140 is a fiber or filament which is filament-shaped and has a diameter of 0.5 millimeter. It is also possible to process a fabric which is composed of a plurality of separate fibers. The filament 140 is guided over the driving elements 141, 142 and 143 and moves at a speed of 10 meters/second in the direction of the arrow 144. Above 142 is a nozzle 145 extending perpendicularly to the plane of drawing; it contains the material 146, for instance, wool flakes, which is to be applied. Said material can leave through a slot 147 and is fed to the slot by shaking. A direct current voltage is applied between 142 and 145 in such a manner that 145 is positively charged and 142 negatively charged. Said voltage amounts to 100 kilovolts as it does in known flocculating or spraying processes. 148 is an electron beam which has a rotational-symmetrical shape. Its current density is 1 milliampere at an accelerating voltage of 50 kilovolts. The electron beam hits the filament 140 at 149 and instantaneously heats a thin surface layer of the filament to about 220° C. Said thin surface layer of the material is softened and partially liquefied.

The application of the material (wool flakes) 146 is caused by the electric field effective between 142 and 145, in a manner similar to electrostatic spraying processes. The advantage of this arrangement consists particularly in that the electron beam permits an accurately controllable heating of the object which is effective only during the short time and in the area 149 of the bonding process. The intensity distribution of the electron beam along the place of bonding 149 can be adjusted by known electron optical means.

Another arrangement for bonding a circular-cylindrical formed object of artificial material with an additional material is shown in the diagram of FIGURE 13. 150 is a fiber of "nylon," which moves through an electrode 151 at a speed of 10 meters/second in direction of the arrow 152. The cone-shaped electrode 151 is charged negatively, for example, with 50 kilovolts with respect to a rotationally symmetrical nozzle 153. Said nozzle 153 contains the material 154 to be applied, for instance, a coloring powder, which is moved toward the centrally running slot 155 and leaves through said slot. The electron beam 156 is likewise rotational symmetrical. Its current density is 2 milliamperes at an accelerating voltage of 50 kilovolts. The beam heats the filament 152 in a ring-shaped area 158 to 220° C. The process now taking place is the same as that described with reference to FIGURE 12 with the difference that the coloring powder is bonded with the surface of the filament 150 on all sides.

In similar manner, any arrangements whatsoever can be devised for band-shaped or, for instance, tubular materials which may be combined with additional materials, e.g., on their inside. It is apparent that the arrangement in FIGURE 13 can advantageously be used with the rotational axis 157 being vertical.

The material to be treated can be bonded intimately, loosely or even temporarily with additional materials of similar or different type by means of the arrangements illustrated in FIGURES 12 and 13 or similarly constructed arrangements. The density of distribution of the materials applied relative to one another is advisably adjusted prior to bonding, preferably automatically. The materials may be subjected to one or several additional treatments which may be of a chemical, electrical, magnetic or mechanical nature.

In the diagram of FIGURES 14, 15 and 16, examples are shown of the arrangement of several portions of material being irradiated by a single electron beam. In FIGURE 14 a rotationally cylindrical filament 160 is shown moving in the direction of the arrow 161. Electrodes 162, 163 and 164 of an electrostatic cylinder lens system focus an electron beam moving in the direction of the arrow 165; the band-shaped electron beam extends perpendicularly to the plane of drawing and impinges on 160. In FIGURE 15 the cross-section 166—167 is shown, in which 168 represents the cross-section of the band-shaped electron beam. By 160, several filaments are represented, which are simultaneously moving across the electron beam in the direction of the arrow 161. FIGURE 16 likewise shows a cross-section 166—167 of FIGURE 14 with the difference that a single filament, being turned back by rolls 170 and 171, moves across the electron beam several times at the irradiation positions 172, 173, and 174.

It is a further subject matter of the invention that formed objects are exposed to several beams of identical and/or different compositions and shapes in equal and/or unequal manner with regard to the time and/or place. An example of this is shown in the diagram of FIGURE 17. Two electron beams 180 and 181, which are independent of one another, are so arranged that their beam axes coincide as indicated by 186. With different beam angles they enter an electron optical lens, for instance, an electrostatic unipotential lens consisting of the electrodes 182 and 183. The beams entering the electrostatic unipotential lens in the manner shown, they are focused in such a way as to possess two different states of focusing when impinging on the cylindrical object 184 shown below the lens. 184 is moved across the beams in the direction of the arrow 185. On principle, it is possible to use two electron guns, located in one plane but having different diameters, as electron beam sources. In this manner, regions of different radiation intensities can be superposed. Thus, it is possible at first to heat mildly each portion of the material entering the outer beam region and thereupon to heat it intensely in the beam center. After leaving the beam center, the lower radiation intensity of the outer beam region causes a corresponding cooling effect.

What is claimed is:

1. An apparatus for the treatment of formed objects made of artificial materials with thermoplastic characteristics comprising an electron gun for producing an electron beam, a chamber enclosing said electron gun, said chamber being held under sub-atmospheric pressure, compartments forming pressure steps arranged beside said chamber and connected with vacuum pumps, transporting means for transporting the objects into said compartments, and means for stretching said objects while said objects are within said compartments.

2. Apparatus for the treatment of formed objects made of polymerized synthetic plastic material having thermoplastic characteristics comprising a storage bunker, a flocculant stored in said bunker, said bunker having a narrow slot for the emission of said flocculant, means for moving said objects past said slot, means for applying an electric voltage between said storage bunker and said objects to induce an electrostatic attraction of the emitted flocculant to the object, and means to heat and melt a thin surface layer of the object as the object is moved past said slot, said last named means comprising an electron beam generator and means to focus said beam on the surface of the object to be melted.

3. Apparatus for the treatment of formed objects made of polymerized synthetic plastic material having thermoplastic characteristics comprising a first transporting means for moving said objects at a first rate of speed, a second transporting means for moving said objects at a second rate of speed higher than said first rate thereby to stretch said objects between the first and second transporting means, means for heating said objects between said first and second transporting means, said heating means comprising an electron gun for producing an electron beam and means for focussing said beam on said object, and means responsive to the difference in speeds between said first and second transporting means, for varying the intensity of said beam.

4. Apparatus for the treatment of formed objects made of polymerized synthetic plastic material having thermoplastic characteristics comprising an electron gun for producing an electron beam, a chamber enclosing said gun, said chamber being held under sub-atmospheric pressure, compartments forming pressure steps arranged beside said chamber and connected with vacuum pumps, transporting means for transporting the objects into said compartments and means for focussing said beam on said object to controllably heat the object to temperatures at which the objects may be stretched.

5. Apparatus for the treatment of formed objects made of polymerized synthetic plastic material having thermoplastic characteristics comprising an electron gun for producing an electron beam, a chamber enclosing said electron gun, said chamber being held under sub-atmospheric pressure, compartments forming pressure steps arranged beside said chamber and connected with vacuum pumps, transporting means for transporting the objects into said compartments and means for focussing said electron beam on said objects to heat and melt the surface thereof.

6. A method for the physical treatment of formed objects made of polymerized synthetic plastic materials having thermoplastic characteristics, comprising heating said objects by directing a beam of charged particles of high radiation density on them, said high radiation density being sufficiently high to effect heating without further polymerization of said material, and subjecting said materials to physical treatment while in the heated state.

7. A method for the treatment of formed objects made of polymerized synthetic plastic materials with thermoplastic characteristics, comprising heating said objects by directing a beam of charged particles of high radiation density on them, said high radiation density being sufficiently high to effect heating without further polymerization of said material, regulating the direction of impingement of said beam by electron-optical means, and applying to said objects in the heated state additional materials of different types, thereby to induce adhesion of said additional materials.

8. The method of claim 7 in which the materials coated onto the irradiated product are electrically conductive.

9. The method of claim 7 in which the materials coated onto the irradiated objects are of fibrous texture.

10. A method for the treatment of polymerized synthetic thermoplastic material comprising heating the objects by directing a beam of charged particles of high radiation density on the material, said high radiation density being sufficiently high to effect heating without further polymerization of said material, and applying additional material to the heated material to weld said additional material thereto.

11 The method of claim 10 in which said objects are heated at preselected surface locations by means of said radiation.

References Cited in the file of this patent

UNITED STATES PATENTS

| | | |
|---|---|---|
| 1,906,402 | Newton | May 2, 1933 |
| 2,405,662 | McManus et al. | Aug. 13, 1946 |
| 2,668,133 | Brophy | Feb. 2, 1954 |
| 2,763,609 | Lewis et al. | Sept. 18, 1956 |

OTHER REFERENCES

"Irradiation of Linear High Polymers" Nature, December 20, 1952, pp. 1075–6. 18-Rad. Dig.